US012506236B2

(12) United States Patent
Feng et al.

(10) Patent No.: US 12,506,236 B2
(45) Date of Patent: Dec. 23, 2025

(54) PHASE SHIFTER UNIT INCLUDING AN ADJUSTABLE DIELECTRIC LAYER FOR FORMING CAPACITORS WITH CONDUCTING LAYER PATTERNS, WHERE THE CAPACITORS ARE CONFIGURED INTO FIRST AND SECOND LOOPS

(71) Applicants: Beijing BOE Sensor Technology Co., Ltd., Beijing (CN); BOE Technology Group Co., Ltd., Beijing (CN)

(72) Inventors: Chunnan Feng, Beijing (CN); Zhifeng Zhang, Beijing (CN); Chuncheng Che, Beijing (CN)

(73) Assignees: Beijing BOE Sensor Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 349 days.

(21) Appl. No.: 18/028,316

(22) PCT Filed: Jun. 29, 2022

(86) PCT No.: PCT/CN2022/102425

§ 371 (c)(1),
(2) Date: Mar. 24, 2023

(87) PCT Pub. No.: WO2024/000289

PCT Pub. Date: Jan. 4, 2024

(65) Prior Publication Data

US 2024/0313377 A1 Sep. 19, 2024

(51) Int. Cl.
*H01P 1/18* (2006.01)

(52) U.S. Cl.
CPC .............. *H01P 1/181* (2013.01); *H01P 1/184* (2013.01)

(58) Field of Classification Search
CPC ................................. H01P 1/181; H01P 1/184
USPC ........................................................ 333/161
See application file for complete search history.

(56) References Cited

U.S. PATENT DOCUMENTS

| | | | | |
|---|---|---|---|---|
| 10,629,973 | B2 * | 4/2020 | Jakoby et al. | H01P 1/181 |
| 2008/0012660 | A1 | 1/2008 | Nakasha et al. | |
| 2020/0243969 | A1 | 7/2020 | Fang et al. | |
| 2021/0265713 | A1 | 8/2021 | Fang et al. | |
| 2021/0367314 | A1 * | 11/2021 | Hu et al. | H01P 9/006 |

FOREIGN PATENT DOCUMENTS

| | | | |
|---|---|---|---|
| CN | 110137636 | A | 8/2019 |
| CN | 112951176 | A | 6/2021 |
| WO | 2019210825 | A1 | 11/2019 |

* cited by examiner

*Primary Examiner* — Benny T Lee
(74) *Attorney, Agent, or Firm* — IPro, PLLC

(57) ABSTRACT

The present disclosure provides a phase shifter unit and a phase shifter. The phase shifter unit includes a first substrate and a second substrate which are oppositely arranged; an adjustable dielectric layer between the first substrate and the second substrate; a first conducting layer on a surface of a side, facing the adjustable dielectric layer, of the first substrate; a plurality of second conducting layers on a surface of a side, facing the adjustable dielectric layer, of the second substrate, where the second conducting layers are arranged at intervals; and a ground layer on a surface of a side, facing away from the adjustable dielectric layer, of the second substrate.

12 Claims, 6 Drawing Sheets

--PRIOR ART--

PHASE SHIFTER UNIT INCLUDING AN ADJUSTABLE DIELECTRIC LAYER FOR FORMING CAPACITORS WITH CONDUCTING LAYER PATTERNS, WHERE THE CAPACITORS ARE CONFIGURED INTO FIRST AND SECOND LOOPS

CROSS-REFERENCE TO RELATED APPLICATIONS

The disclosure is a National Stage of International Application No. PCT/CN2022/102425, filed on Jun. 29, 2022, which is hereby incorporated by reference in their entireties.

FIELD

The present disclosure relates to the technical field of phase shifters, in particular to a phase shifter unit and a phase shifter.

BACKGROUND

A phased-array antenna plays an important role in a modern wireless communication system with its excellent characteristics such as fast beam scanning; and as an important constitute part of the phased-array antenna, the structure and performance of a phase shifter directly affect the behavior of the whole phased-array antenna.

An existing phase shifter needs to use many phase shifting branches and matching branches, is not high in phase shifting efficiency, and needs to use a balun to reduce loss. It is necessary to consider a specific connection technology between the balun and a phase shifting matching unit, so the overall size of the phase shifter is relatively large, which is limited in practical applications, and the overall efficiency is relatively low.

SUMMARY OF THE INVENTION

The present disclosure discloses a phase shifter unit and a phase shifter, and the phase shifter unit is configured to have a function of being greater in a phase shifting magnitude at a certain size.

In order to achieve the above objective, the present disclosure provides the following technical solution.

In an aspect, the present disclosure provides a phase shifter unit, including:

- a first substrate and a second substrate which are oppositely arranged;
- an adjustable dielectric layer between the first substrate and the second substrate;
- a first conducting layer on a surface of a side, facing the adjustable dielectric layer, of the first substrate;
- a plurality of second conducting layers on a surface of a side, facing the adjustable dielectric layer, of the second substrate; where the second conducting layers are arranged at intervals; and
- a ground layer on a surface of a side, facing away from the adjustable dielectric layer, of the second substrate;
- where a pattern of the first conducting layer and patterns of the second conducting layers are all divided into a first region and a second region; in the first region, the pattern of the first conducting layer mutually overlaps the patterns of the second conducting layers, and the first conducting layer, the second conducting layers and the adjustable dielectric layer between the first conducting layer and the second conducting layers constitute capacitors; and in the second region, the pattern of the first conducting layer does not overlap the patterns of the second conducting layers, and the second conducting layers, the ground layer and the second substrate between the second conducting layers and the ground layer constitute transmission lines; and
- the phase shifter unit includes a first port, a second port, and a first loop and a second loop which are connected in series between the first port and the second port; a signal is transmitted to the second port from the first port; and in a signal transmission direction, a plurality of capacitors are sequentially connected in series through transmission lines to form the first loop; and a plurality of capacitors are sequentially connected in series through transmission lines to form the second loop.

The phase shifter unit provided by the embodiments of the present disclosure includes the first substrate and the second substrate which are oppositely arranged; the adjustable dielectric layer is arranged between the first substrate and the second substrate; and in a direction of the first substrate pointing to the second substrate, that is, from top to bottom, the first conducting layer, the second conducting layers and the ground layer are sequentially arranged. Specifically, the first conducting layer is on the surface of the side, facing the adjustable dielectric layer, of the first substrate; the second conducting layers are on the surface of the side, facing the adjustable dielectric layer, of the second substrate; the second conducting layers are arranged at intervals; and the ground layer is on the surface of the side, facing away from the adjustable dielectric layer, of the second substrate. The pattern of the first conducting layer and the patterns of the second conducting layers are all divided into the first region and the second region; in the first region, the pattern of the first conducting layer mutually overlaps the patterns of the second conducting layers, and mutually overlapping parts of the first conducting layer, the second conducting layers and the adjustable dielectric layer between the first conducting layer and the second conducting layers constitute the capacitors; and in the second region, the pattern of the first conducting layer does not overlap the patterns of the second conducting layers, and the second conducting layers, the ground layer and the second substrate between the second conducting layers and the ground layer constitute the transmission lines. The transmission lines are mainly composed of the second conducting layers, the ground layer and the second substrate; and the capacitors are mainly composed of the first conducting layer, the second conducting layers and the adjustable dielectric layer between the first conducting layer and the second conducting layers. The phase shifter unit has the first port, the second port, and the first loop and the second loop which are connected in series between the first port and the second port, a signal is transmitted to the second port from the first port, a single-ended phase shifting unit is formed by using the transmission lines and the capacitors, and the ports of the phase shifting unit have the effects of good standing wave and high phase shifting. In the signal transmission direction, the plurality of capacitors are sequentially connected in series through the transmission lines to form the first loop; and the plurality of capacitors are sequentially connected in series through the transmission lines to form the second loop. A certain phase shifting magnitude value is achieved through specific transmission line and capacitor structure size design, and thus the phase shifter unit has the function of being greater in the phase shifting magnitude at a certain size. The transmission lines and the equivalent capacitors are used to form a single-ended feed LC-type phase shifter, a balun is not needed for difference conversion, the size of the phase shifter is greatly reduced, and the loss of the phase shifter is reduced.

Optionally, the phase shifter unit further includes a first branch circuit, including a first part and a second part; where a first end of the first part is connected with the first port, a second end of the first part is connected with a first end of the second part, and a second end of the second part is connected with the second port;

a second branch circuit; where a first end of the second branch circuit is connected with the first end of the first part, and a second end of the second branch circuit is connected with the second end of the first part; and a third branch circuit; where a first end of the third branch circuit is connected with the first end of the second part, and a second end of the third branch circuit is connected with the second end of the second part;

where the first part and the second branch circuit form the first loop, and the second part and the third branch circuit form the second loop.

Optionally, the number of the transmission lines of the first loop is the same as the number of the transmission lines of the second loop; and the number of the capacitors of the first loop is the same as the number of the capacitors of the second loop.

Optionally, in the first loop, the number of the transmission lines is five, and the number of the capacitors is five; and in the second loop, the number of the transmission lines is five, and the number of the capacitors is five.

Optionally, the first part is different from the second part.

Optionally, the first part includes one first transmission line.

Optionally, the second part includes one capacitor and two transmission lines; and in the transmission line direction, the transmission line, the capacitor and the transmission line are sequentially arranged.

Optionally, the second branch circuit includes five capacitors and four transmission lines; and a capacitor is arranged at both the first end and the second end of the second branch circuit, and in the signal transmission direction, the capacitors and the transmission lines are arranged at intervals.

Optionally, the third branch circuit includes four capacitors and three transmission lines; and a capacitor is arranged at both the first end and the second end of the third branch circuit; and in the signal transmission direction, the capacitors and the transmission lines are arranged at intervals.

Optionally, a material of the adjustable dielectric layer is a liquid crystal material.

Optionally, materials of the first substrate and the second substrate are glass.

Optionally, a material of the first conducting layer is the same as a material of the second conducting layers.

Optionally, a material of the first conducting layer includes metal or indium tin oxide; and a material of the second conducting layers includes metal or indium tin oxide.

In another aspect, the present disclosure provides a phase shifter, including the plurality of above phase shifter units connected in series.

Reference signs: 1—First substrate; 2—Second substrate; 3—Adjustable dielectric layer; 4—First conducting layer; 5—Second conducting layer; 6—Ground layer; S1—First region; S2—Second region; A—First port; B—Second port; C—First branch circuit; C1—First part; C2—Second part; D—Second branch circuit; E—Third branch circuit; F—First loop; and G—Second loop.

DETAILED DESCRIPTION OF THE EMBODIMENTS

The technical solutions in the embodiments of the present disclosure will be described clearly and completely with reference to accompanying drawings of the embodiments of the present disclosure. It is apparent that the described embodiments are part of, rather than all of, embodiments of the present disclosure. Based on the embodiments of the present disclosure, all other embodiments obtained by those ordinarily skilled in the art without creative labor fall within the protection scope of the present disclosure.

Figure 1:
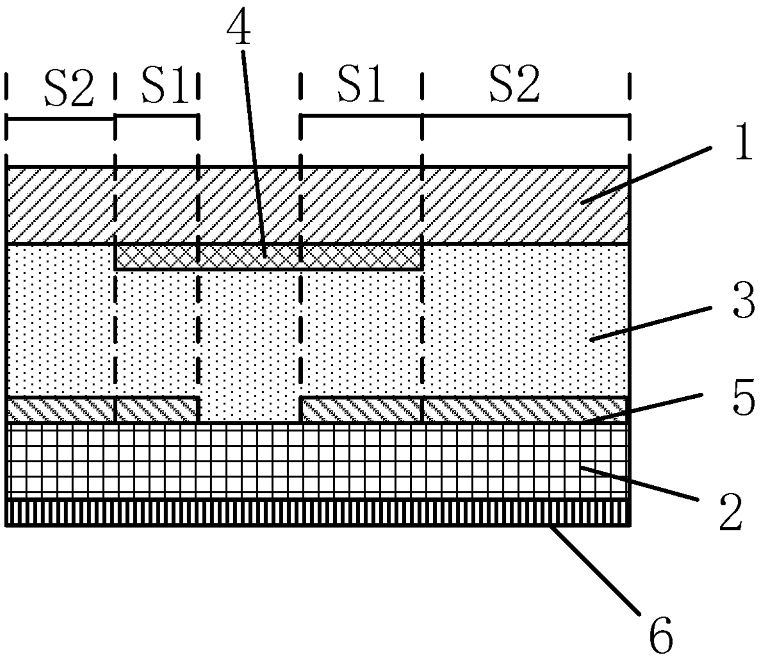
FIG. 1 is a schematic structural diagram of film layers of a phase shifter unit provided by an embodiment of the present disclosure.
Figure 2:
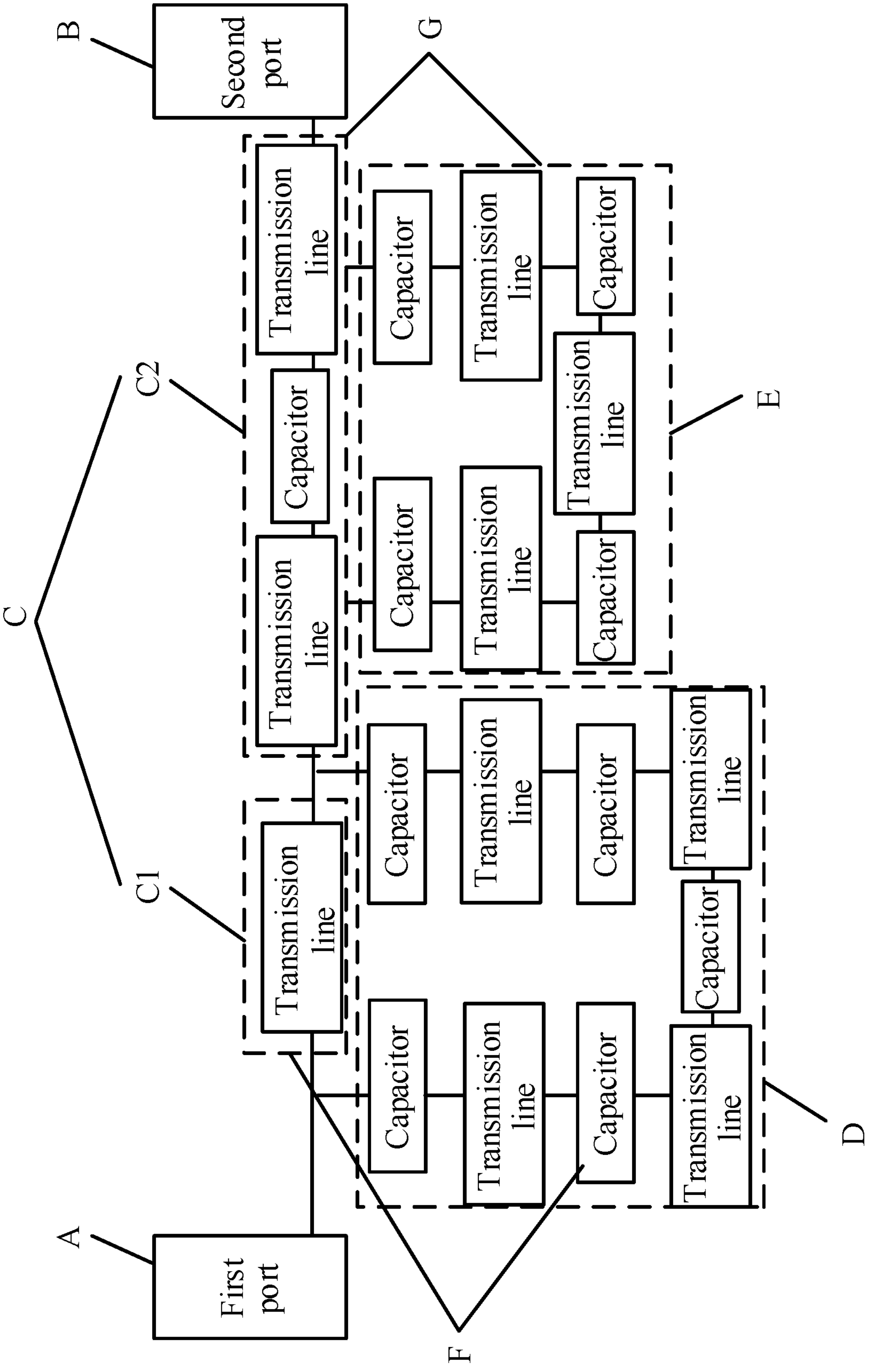
FIG. 2 is schematic diagram of a circuit connection of a phase shifter unit provided by an embodiment of the present disclosure.

As shown in FIG. 1, embodiments of the present disclosure provide a phase shifter unit, including:

a first substrate 1 and a second substrate 2 which are oppositely arranged;

an adjustable dielectric layer 3 between the first substrate 1 and the second substrate 2;

a first conducting layer 4 located on a surface of a side, facing the adjustable dielectric layer 3, of the first substrate 1;

a plurality of second conducting layers 5 located on a surface of a side, facing the adjustable dielectric layer 3, of the second substrate 2; where the second conducting layers 5 are arranged at intervals; and a ground layer 6 located on a surface of a side, facing away from the adjustable dielectric layer 3, of the second substrate 2;

where a pattern of the first conducting layer 4 and patterns of the second conducting layers 5 are all divided into a first region S1 and a second region S2; and in the first region S1, the pattern of the first conducting layer 4 and the patterns of the second conducting layers 5 overlap each other and constitute capacitors; and in the second region S2, the pattern of the first conducting layer 4 and the patterns of the second conducting layers 5 do not overlap and constitute transmission lines; and as shown in FIG. 2, the phase shifter unit includes a first port A, a second port B, and a first loop F and a second loop G which are connected in series between the first port A and the second port B; a signal is transmitted to the second port B from the first port A; and in a signal transmission direction, a plurality of capacitors are sequentially connected in series through the transmission lines to form the first loop F; and a plurality of capacitors are sequentially connected in series through the transmission lines to form the second loop G.

A phase shifting unit of a traditional difference phase shifter is a fixed electromagnetic structure, due to the characteristics of the capacitor itself, liquid crystal phase shifting magnitudes in different frequency bands are different, which affects a signal quality. In the present disclosure, the equivalent circuit of the phase shifting unit adopts a complementary phase shifting structure, which reduces the influence of the capacitor itself on the phase shifting magnitudes in different frequency bands, so that phase consistency of the phase shifter itself is better.

It should be noted that the phase shifter unit provided by the embodiments of the present disclosure includes the first substrate 1 and the second substrate 2 which are oppositely arranged; the adjustable dielectric layer 3 is arranged between the first substrate 1 and the second substrate 2; and in a direction of the first substrate 1 pointing to the second substrate 2, that is, from top to bottom, the first conducting layer 4, the second conducting layers 5 and the ground layer 6 are sequentially arranged. Specifically, the first conducting layer 4 is on the surface of the side, facing the adjustable dielectric layer 3, of the first substrate 1; the second conducting layers 5 are on the surface of the side, facing the adjustable dielectric layer 3, of the second substrate 2; the second conducting layers 5 are arranged at intervals; and the ground layer 6 is on the surface of the side, facing away from the adjustable dielectric layer 3, of the second substrate 2. The pattern of the first conducting layer 4 and the patterns of the second conducting layers 5 are all divided into the first region S1 and the second region S2; in the first region S1, the pattern of the first conducting layer 4 mutually overlaps the patterns of the second conducting layers 5, and mutually overlapping parts of the first conducting layer 4, the second conducting layers 5 and the adjustable dielectric layer 3 between the first conducting layer 4 and the second conducting layers 5 constitute the capacitors; and in the second region S2, the pattern of the first conducting layer 4 does not mutually overlap the patterns of the second conducting layers 5, and the second conducting layers 5, the ground layer 6 and the second substrate 2 between the second conducting layers 5 and the ground layer 6 constitute the transmission lines. The transmission lines are mainly composed of the second conducting layers 5, the ground layer 6 and the second substrate 2; and the capacitors are mainly composed of the first conducting layer 4, the second conducting layers 5 and the adjustable dielectric layer 3 between the first conducting layer 4 and the second conducting layers 5. As shown in FIG. 2, the phase shifter unit has the first port A, the second port B, and the first loop F and the second loop G which are connected in series between the first port A and the second port B. The signal is transmitted to the second port B from the first port A, the transmission lines and the capacitors are used to form a single-ended phase shifting unit, and the ports of the phase shifting unit have the effects that provide for good standing wave and high phase shifting efficiency. In the signal transmission direction, the plurality of capacitors are sequentially connected in series through the transmission lines to form the first loop F; and the plurality of capacitors are sequentially connected in series through the transmission lines to form the second loop G. Through the specific transmission line and capacitor structure size design, a certain phase shifting magnitude value is achieved, so that the phase shifter unit has the function of being greater in a phase shifting magnitude at the certain size. The transmission lines and the equivalent capacitors are used to form the single-ended feed LC-type phase shifter, a balun is not needed for difference conversion, the size of the phase shifter is greatly reduced, and the loss of the phase shifter is reduced.

Continuing to refer to FIG. 1, if a signal enters from the right, in the second region S2, the signal is first transmitted through the transmission line formed by the second conducting layer 5, the ground layer 6 and the second substrate 2 between the second conducting layer 5 and the ground layer 6; then the signal continues to be transmitted into a capacitor, in the first region S1, formed by the first conducting layer 4, the second conducting layer 5 and the adjustable dielectric layer 3 between the first conducting layer 4 and the second conducting layer 5 in the first region S1; and then the signal continues to be transmitted to a capacitor in another first region S1. Here, the two adjacent capacitors are connected in series to be used as a capacitor in FIG. 2, the capacitors are connected in series to enlarge an area of the capacitor, a manufacturing tolerance may be small, and the consistency may be good. The signal continues to be transmitted into another second region S2; the signal is transmitted first through the transmission line formed by the second conducting layer 5, the ground layer 6 and the second substrate 2 between the second conducting layer 5 and the ground layer 6; and then as shown in FIG. 2, through a repeat connection in a mode of the capacitor, the transmission line and the capacitor, the structure of the phase shifter unit provided by the embodiments of the present disclosure is implemented.

Specifically, the transmission line is equivalent to a microstrip line, the microstrip line is a microwave transmission line formed by a single conductor supported on a medium substrate, and the transmission line has the advantages of small volume, less weight and the like. Materials of the first conducting layer 4, the second conducting layers 5 and the ground layer 6 may be the same, or may be different. For example, the material of the first conducting layer 4 may be copper, indium tin oxide (ITO) or silver and the like; different materials have different conductivities and different losses; and therefore, the materials may be selected according to the phase shifting magnitude of the phase shifter provided by the embodiments of the present disclosure. Similarly, the material of the second conducting layers 5 may be copper, ITO or silver and the like; different materials have different conductivities and different losses; and therefore, the materials may be selected according to the phase shifting magnitude of the phase shifter provided by the embodiments of the present disclosure. Certainly, the material of the ground layer 6 may be copper, ITO or silver and the like; different materials have different conductivities and different losses; and therefore, the materials may be selected according to the phase shifting magnitude of the phase shifter provided by the embodiments of the present disclosure.

In addition, materials of the first substrate 1 and the second substrate 2 are glass. Certainly, the substrates may also be other materials; and the materials of the first substrate 1 and the second substrate 2 may further be different in compositions. The second substrate 2 serves as a medium substrate between the microstrip lines, and is a dielectric medium. The dielectric medium is an insulator capable of being electrically polarized; a solid dielectric medium includes a crystalline state dielectric medium and an amorphous state dielectric medium; and the amorphous state dielectric medium includes glass, resin, high polymers and the like, and is a good insulating material.

In the first region S1, an area of the capacitor is not specifically limited, and a specific size of the area of the capacitor may be selected according to the phase shifting magnitude of the phase shifter provided by the embodiments of the present disclosure. Similarly, in the second region S2, a length of the transmission line is not also specifically limited, and the length of the transmission line may be selected according to the phase shifting magnitude of the phase shifter provided by the embodiments of the present disclosure.

Continuing to refer to FIG. 2, a signal enters from the first port A and outflows from the second port B; and the phase shifter unit includes:

- a first branch circuit C including a first part C1 and a second part C2, where a first end of the first part C1 is connected with the first port A, a second end of the first part C1 is connected with a first end of the second part C2, and a second end of the second part C2 is connected with the second port B;
- a second branch circuit D, where a first end of the second branch circuit D is connected with the first end of the first part C1, and a second end of the second branch circuit D is connected with the second end of the first part C1;
- a third branch circuit E, where a first end of the third branch circuit E is connected with the first end of the second part C2, and a second end of the third branch circuit E is connected with the second end of the second part C2;
- where the first part C1 and the second branch circuit D form the first loop F, and the second part C2 and the third branch circuit E form the second loop G.

A specific structure of the first loop F and the second loop G is as follows: the number of the transmission lines of the first loop F is the same as the number of the transmission lines of the second loop G; and the number of the capacitors of the first loop F is the same as the number of the capacitors of the second loop G.

A complementary circuit structure of transmission lines and capacitors is adopted in the first loop F and the second loop G; on the circuit structure of the first loop F and the second loop G, the phase change caused by the capacitor is reduced through a series connection of the transmission lines and the capacitors; and the problem of inconsistency of changes of the phase shifting magnitudes at different frequency bands can be solved.

Continuing to refer to FIG. 2, specifically, in the first loop F, the number of the transmission lines is five, and the number of the capacitors is five; and in the second loop G, the number of the transmission lines is five, and the number of the capacitors is five.

The first part C1 is different from the second part C2. The first part C1 includes one transmission line. The second part C2 includes one capacitor and two transmission lines; and in the signal transmission direction, the transmission line, the capacitor and the transmission line are sequentially arranged.

In addition, the second branch circuit D includes five capacitors and four transmission lines; a capacitor is arranged at both the first end and the second end of the second branch circuit D; and in the signal transmission direction, the capacitors and the transmission lines are arranged at intervals.

In addition, the third branch circuit E includes four capacitors and three transmission lines; a capacitor is arranged at both the first end and the second end of the third branch circuit E; and in the signal transmission direction, the capacitors and the transmission lines are arranged at intervals.

Specifically, a material of the adjustable dielectric layer 3 is a liquid crystal material.

Liquid crystal (LC) shows features and properties of general liquid and solid crystal. For example, LC may flow like liquid, but molecules of the LC may be oriented like a crystalline mode. The material of the adjustable dielectric layer 3 includes the liquid crystal material, for example, liquid crystal molecules in the liquid crystal material may be positive liquid crystal molecules or negative liquid crystal molecules.

Figure 3:
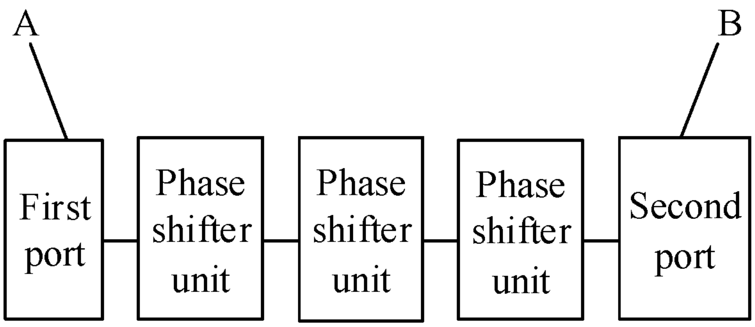
FIG. 3 is schematic structural diagram of a phase shifter provided by an embodiment of the present disclosure.
Figure 4:
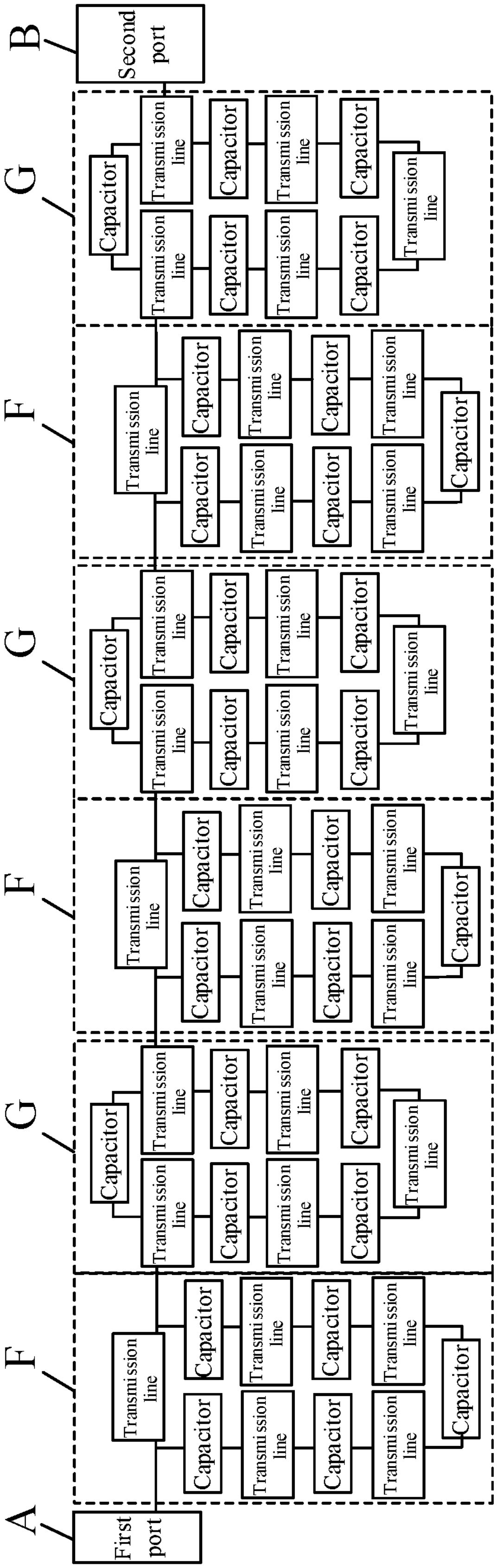
FIG. 4 is a schematic diagram of a specific circuit connection of FIG. 3.

As shown in FIG. 3 and FIG. 4, in a second aspect, embodiments of the present disclosure provide a phase shifter, including a plurality of phase shifter units connected in series of any one of the first aspect. As shown in FIG. 4, the phase shifter unit includes a first loop F and a second loop G. The first port A serves as a signal input end, and the second port B serves as a signal output end. The number of the phase shifter units connected in series here may be selected according to the overall phase shifting magnitudes of the phase shifter, and the number in the figure is only illustrative.

Figure 5:
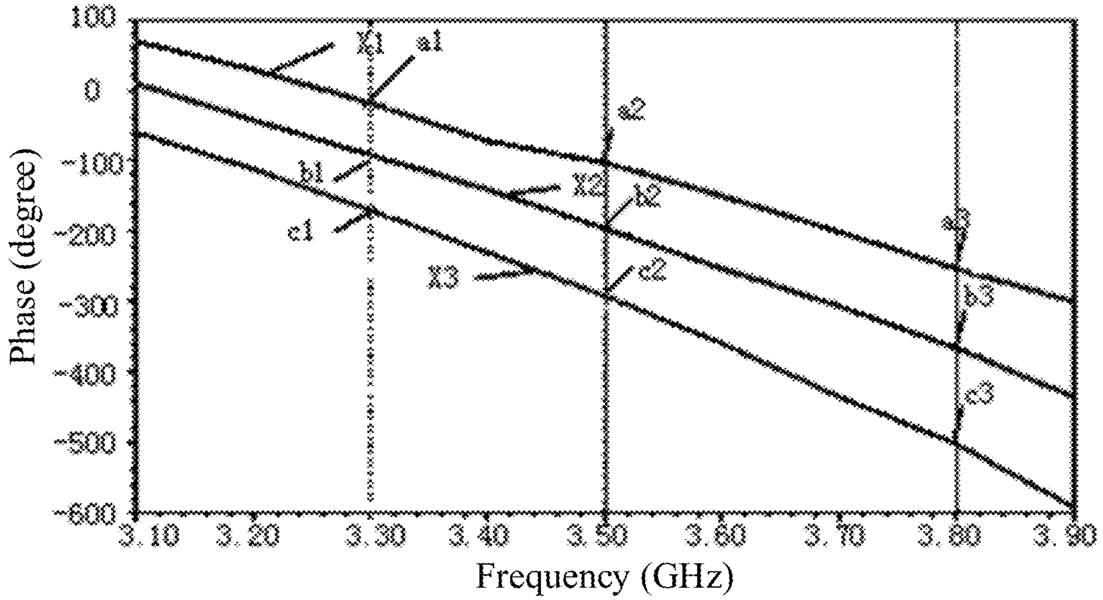
FIG. 5 is a graph showing phases with frequency changes of a traditional phase shifter.

It can be seen from FIG. 5 which is a graph showing phases (Degrees) with frequency (GHz) changes of a traditional phase shifter, in curves X1, X2, and X3 of phase shifting magnitude values at three different voltages, at a frequency of 3.3 GHZ, phases are −18 at a point a1, −92 at a point b1, and −170 at a point c1; and a difference value of every two adjacent points, namely, the phase changes, are 74 and 78 respectively; at a frequency of 3.5 GHZ, phases are −103 at a point a2, −197 at a point b2, and −292 at a point c2; and a difference value of every two adjacent points, namely, the phase changes, are 94 and 95 respectively; and at a frequency of 3.8 GHZ, phases are −254 at a point a3, −367 at a point b3, and −503 at a point c3; a difference value of every two adjacent points, namely, the phase changes, are 113 and 136 respectively. The phase change of a traditional liquid crystal phase shifter is enlarged with rising of the frequency, in this way, distortion is caused to a radio-frequency signal, and the signal quality is affected.

Figure 6:
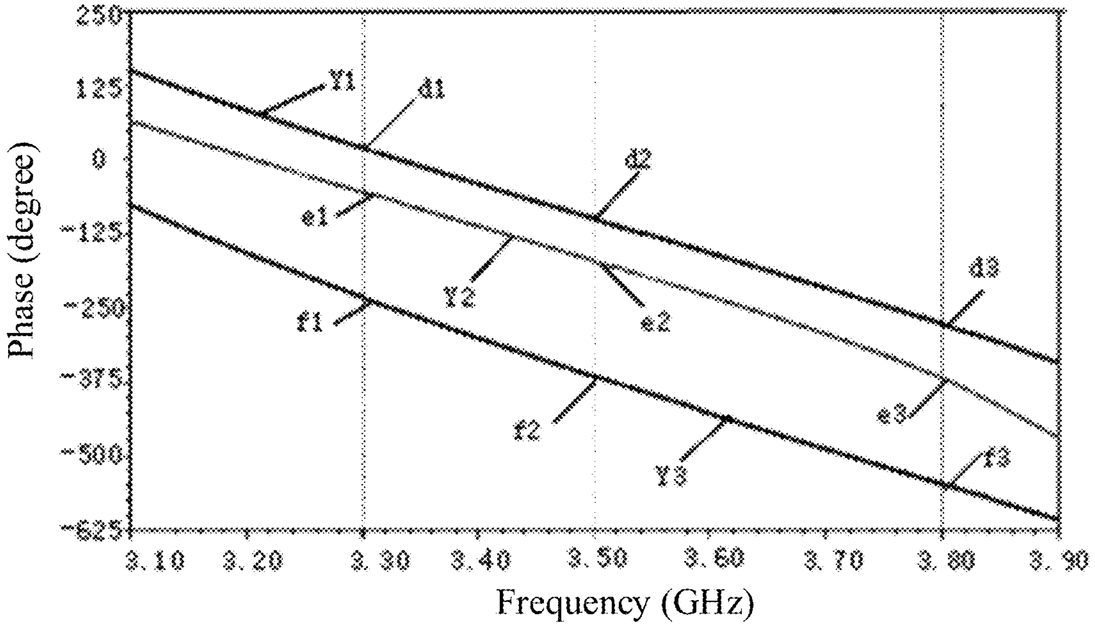
FIG. 6 is a graph showing phases with frequency changes of a phase shifter provided by an embodiment of the present disclosure.

Compared with FIG. 5, FIG. 6 is a graph showing phases (Degrees) with frequency (GHz) changes of a phase shifter provided by an embodiment of the present disclosure. It can be seen from FIG. 6 that in curves Y1, Y2, and Y3 of phase shifting magnitude values at three different voltages, at a frequency of 3.3 GHZ, phases are −18 at a point d1, −55 at a point e1, and −232 at a point f1; and a difference value of every two adjacent points, namely, the phase changes, are 37 and 177 respectively; at a frequency of 3.5 GHZ, phases are −99 at a point d2, −170 at a point e2, and −366 at a point f2; and a difference value of every two adjacent points, namely, the phase changes, are 71 and 196 respectively; and at a frequency of 3.8 GHZ, phases are −277 at a point d3, −369 at a point e3, and −548 at a point f3; and a difference value of every two adjacent points, namely, the phase changes, are 92 and 179 respectively. In FIG. 5, the phase change of a phase shifter in the present disclosure exhibits minimal variation with rising of the frequency, and distortion influence on a radio-frequency signal is small.

Figure 7:
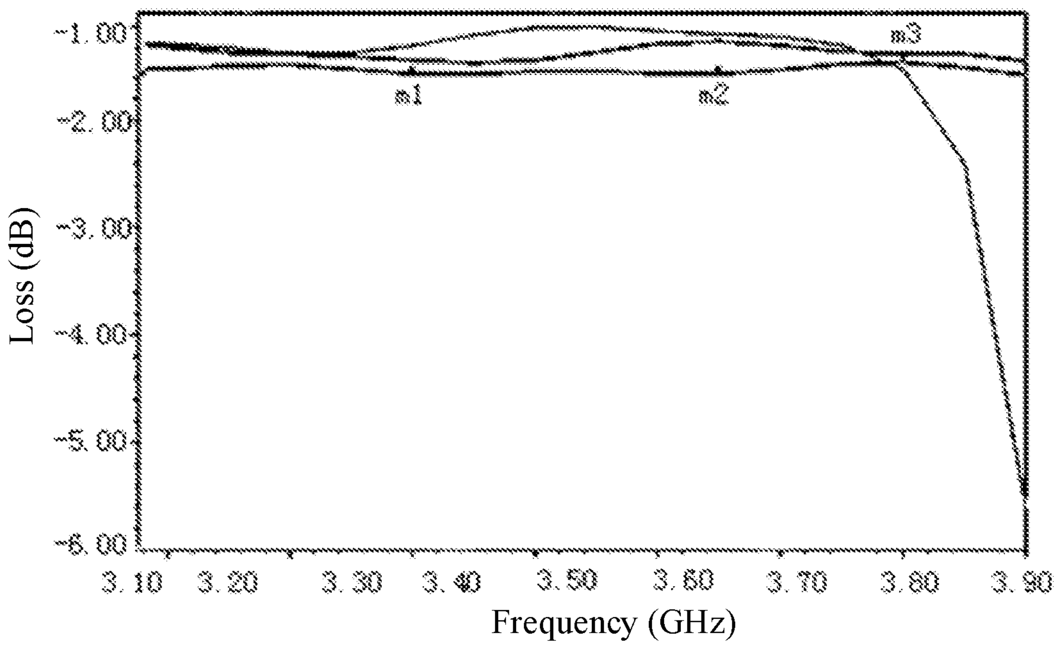
FIG. 7 is a graph showing insertion loss of a phase shifter provided by an embodiment of the present disclosure.

FIG. 7 is a graph showing insertion loss (dB) with frequency (GHz) changes of a phase shifter provided by an embodiment of the present disclosure. FIG. 7 is a simulation of insertion loss S21 of a phase shifter provided by an embodiment of the present disclosure; the loss is a loss of an energy penetrating through an object; and when the loss is smaller than 1 dB, that is, the loss is very small. Therefore, in FIG. 7, whether a point m1, m2 or m3, their corresponding loss values are all lower than 1 dB, and therefore, it may be considered that the insertion loss of the phase shifter provided by the embodiments of the present disclosure is very small.

Figure 8:
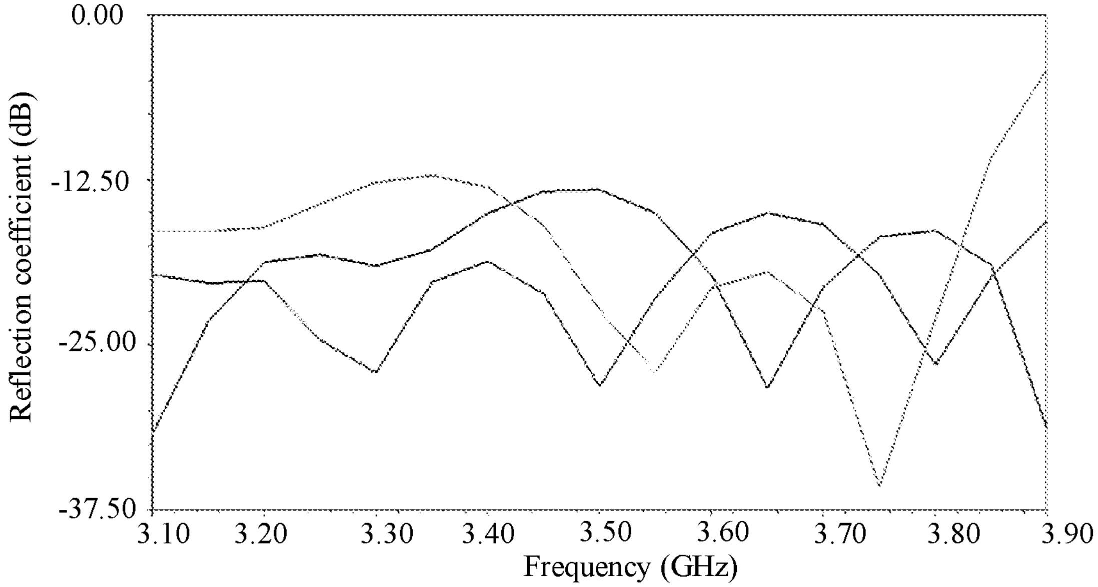
FIG. 8 is a graph showing a reflection coefficient of a phase shifter provided by an embodiment of the present disclosure.

FIG. 8 is a graph showing a reflection coefficient (dB) with frequency (GHz) changes of a phase shifter provided by an embodiment of the present disclosure. FIG. 8 is a graph showing a reflection coefficient S11 of a phase shifter provided by the embodiment of the present disclosure. An energy may generate certain reflection when the energy enters a first port A; and the more reflection that occurs, the lower the energy entering the phase shifter, such that lesser reflection results in better phase shifter operation. In FIG. 8, when S11 is smaller than −10 dB, the effect is very good. In three curves simulated at different voltages in FIG. 8, corresponding reflection coefficients of S11 are basically lower than −10 dB; and therefore, it may be considered that the reflection of the phase shifter provided by the embodiments of the present disclosure is less.

It will be apparent to those skilled in the art that various modifications and variations can be made in the present disclosure without departing from the spirit or scope of the present disclosure. Thus, it is intended that the present disclosure cover the modifications and variations of the present disclosure provided they come within the scope of the appended claims of the present disclosure and their equivalents.

What is claimed is:

1. A phase shifter unit, comprising:

a first substrate and a second substrate which are oppositely arranged;

an adjustable dielectric layer between the first substrate and the second substrate;

a first conducting layer on a surface of a side, facing the adjustable dielectric layer, of the first substrate;

a plurality of second conducting layers on a surface of a side, facing the adjustable dielectric layer, of the second substrate; wherein the plurality of second conducting layers are arranged at intervals; and a ground layer on a surface of a side, facing away from the adjustable dielectric layer, of the second substrate;

wherein a pattern of the first conducting layer and patterns of the plurality of second conducting layers are all divided into a first region and a second region; in the first region, the pattern of the first conducting layer mutually overlaps the patterns of the plurality of second conducting layers, and the first conducting layer, the plurality of second conducting layers and the adjustable dielectric layer between the first conducting layer and the plurality of second conducting layers constitute capacitors; and in the second region, the pattern of the first conducting layer does not overlap the patterns of the plurality of second conducting layers, and the plurality of second conducting layers, the ground layer and the second substrate between the plurality of second conducting layers and the ground layer constitute transmission lines; and the phase shifter unit comprises a first port, a second port, and a first loop and a second loop which are connected in series between the first port and the second port; a signal is transmitted to the second port from the first port; and in a signal transmission direction, a plurality of capacitors among the capacitors are sequentially connected in series through part of the transmission lines to form the first loop; and a plurality of capacitors among the capacitors are sequentially connected in series through part of the transmission lines to form the second loop;

wherein the phase shifter unit further comprises:

a first branch circuit, comprising a first part and a second part; wherein a first end of the first part is connected with the first port, a second end of the first part is connected with a first end of the second part, and a second end of the second part is connected with the second port;

a second branch circuit; wherein a first end of the second branch circuit is connected with the first end of the first part, and a second end of the second branch circuit is connected with the second end of the first part; and a third branch circuit; wherein a first end of the third branch circuit is connected with the first end of the second part, and a second end of the third branch circuit is connected with the second end of the second part;

wherein the first part and the second branch circuit form the first loop, and the second part and the third branch circuit form the second loop.

2. A phase shifter, comprising a plurality of phase shifter units according to claim 1; wherein the plurality of phase shifter units are connected in series.

3. The phase shifter unit according to claim 1, wherein a material of the first conducting layer comprises metal or indium tin oxide; and a material of the plurality of second conducting layers comprises metal or indium tin oxide.

4. The phase shifter unit according to claim 1, wherein a quantity of the transmission lines of the first loop is same as a quantity of the transmission lines of the second loop; and a quantity of the capacitors of the first loop is same as a quantity of the capacitors of the second loop.

5. The phase shifter unit according to claim 4, wherein, in the first loop, the quantity of the transmission lines is five, and the quantity of the capacitors is five; and in the second loop, the quantity of the transmission lines is five, and the quantity of the capacitors is five.

6. The phase shifter unit according to claim 5, wherein the first part comprises one transmission line.

7. The phase shifter unit according to claim 6, wherein, the second part comprises one of the plurality of capacitors in the second loop and two transmission lines; and in the signal transmission direction, on of the two transmission lines, the one capacitor and the other of the two transmission lines are sequentially arranged.

8. The phase shifter unit according to claim 7, wherein the second branch circuit comprises five of the plurality of capacitors in the first loop and four transmission lines; and one of the five capacitors is arranged at both the first end and the second end of the second branch circuit, and in the signal transmission direction, the five capacitors and the four transmission lines are arranged at intervals.

9. The phase shifter unit according to claim 8, wherein the third branch circuit comprises four of the plurality of capacitors in the second loop and three transmission lines; and one of the four capacitors is arranged at both the first end and the second end of the third branch circuit, and in the signal transmission direction, the four capacitors and the three transmission lines are arranged at intervals.

10. The phase shifter unit according to claim 1, wherein a material of the adjustable dielectric layer is a liquid crystal material.

11. The phase shifter unit according to claim 1, wherein materials of the first substrate and the second substrate are glass.

12. The phase shifter unit according to claim 1, wherein a material of the first conducting layer is same as a material of the plurality of second conducting layers.

* * * * *